US011336650B1

(12) United States Patent
Dargude et al.

(10) Patent No.: US 11,336,650 B1
(45) Date of Patent: May 17, 2022

(54) SYSTEMS AND METHODS FOR PRODUCING ACCESS CONTROL LIST CACHES INCLUDING EFFECTIVE INFORMATION ACCESS PERMISSIONS ACROSS DISPARATE STORAGE DEVICES

(71) Applicant: Veritas Technologies LLC, Santa Clara, CA (US)

(72) Inventors: Shailesh Dargude, San Jose, CA (US); Satish Grandhi, Santa Clara, CA (US); Harshit Shah, Mumbai (IN)

(73) Assignee: Veritas Technologies LLC, Santa Clara, CA (US)

( * ) Notice: Subject to any disclaimer, the term of this patent is extended or adjusted under 35 U.S.C. 154(b) by 157 days.

(21) Appl. No.: 16/780,115

(22) Filed: Feb. 3, 2020

Related U.S. Application Data

(63) Continuation-in-part of application No. PCT/US2019/025801, filed on Apr. 4, 2019.

(60) Provisional application No. 62/653,541, filed on Apr. 5, 2018.

(51) Int. Cl.
*G06F 7/04* (2006.01)
*H04L 29/06* (2006.01)

(52) U.S. Cl.
CPC .................................. *H04L 63/101* (2013.01)

(58) Field of Classification Search
CPC ............. H04L 67/2842; H04L 67/1097; H04L 63/0428; H04L 63/101; G06F 21/60; G06F 21/62; G06F 21/6218
See application file for complete search history.

(56) References Cited

U.S. PATENT DOCUMENTS

| | | | | |
|---|---|---|---|---|
| 9,516,028 | B1 * | 12/2016 | Andruschuk | H04L 63/101 |
| 10,152,530 | B1 * | 12/2018 | Hart | G06F 16/284 |
| 2004/0205043 | A1 * | 10/2004 | Alessi | H04M 15/00 |
| 2007/0261102 | A1 * | 11/2007 | Spataro | G06F 21/6218 |
| | | | | 726/2 |
| 2008/0306954 | A1 * | 12/2008 | Hornqvist | G06F 21/6218 |
| 2016/0119284 | A1 * | 4/2016 | Kim | H04L 63/0876 |
| | | | | 726/12 |
| 2018/0295203 | A1 * | 10/2018 | Wilde | H04L 63/101 |

\* cited by examiner

*Primary Examiner* — Chris Parry
*Assistant Examiner* — Weiwei Y Stiltner
(74) *Attorney, Agent, or Firm* — FisherBroyles, LLP (57) ABSTRACT

The disclosed computer-implemented method for producing access control list caches including effective information access permissions across disparate storage devices may include (i) receiving, at a computing device, an instruction to prepare an access control list (ACL) cache and (ii) performing a security action. The security action may include (A) recursively parsing, at the computing device, at least one respective ACL for information stored on at least two disparate storage devices, (B) identifying, at each step of recursion, each direct user and each indirect user having information access permissions in at least one of the respective ACLs, (C) determining, for each unique user in the respective ACLs, per-control point effective permissions, and (D) storing the per-control point effective information access permissions in the ACL cache. Various other methods, systems, and computer-readable media are also disclosed.

21 Claims, 4 Drawing Sheets

Custodian Users 402

| User/Group Name | Membership |
|---|---|
| User 1 | |
| User 2 | |
| User 3 | |
| User 4 | |
| User 5 | |
| Group 1 | User 1, User 3 |
| Group 2 | User 4, User 5 |
| Group 3 | Group 2 |

Access Control List One 406

| Access Type | Access Mask | User/Group |
|---|---|---|
| DENY | READ | User 1 |
| ALLOW | READ | User 2 |
| DENY | WRITE | Group 1 |
| ALLOW | READ | Group 3 |

File Directory Structure 404

| Filer | | | | |
|---|---|---|---|---|
| / | (Share Level ACL) | | | ACL1 |
| \|- | Folder 1 | | | |
| \| | \|- | Folder 2 | | ACL2 |
| \| | | \|- | Folder 3 | |
| \| | | | \|- | ACL3 |
| *FILE 2* | | | *FILE 2* | |

Flattened ACL One 408

| User/Group | Access | Mask | Group | Indirect Group |
|---|---|---|---|---|
| User 1 | READ | DENY | Direct | |
| User 2 | READ | ALLOW | Direct | |
| User 1 | WRITE | DENY | Group 1 | Group 1 |
| User 3 | WRITE | DENY | Group 1 | Group 1 |
| User 4 | READ | ALLOW | Group 3 | Group 2 |
| User 5 | READ | ALLOW | Group 3 | Group 2 |

*FIG. 4*

SYSTEMS AND METHODS FOR PRODUCING ACCESS CONTROL LIST CACHES INCLUDING EFFECTIVE INFORMATION ACCESS PERMISSIONS ACROSS DISPARATE STORAGE DEVICES

CROSS REFERENCE TO RELATED APPLICATION

This application is a continuation-in-part of PCT Application No. PCT/US2019/025801 filed Apr. 4, 2019, which claims the benefit of U.S. Provisional Application No. 62/653,541, filed Apr. 5, 2018, the disclosures of each of which are incorporated, in their entireties, by this reference.

BACKGROUND

Objects on content sources across disparate storage devices may be secured using access control properties. In some examples, content sources may have uniquely assigned permissions on the objects whereby owners of the objects can control operations on objects by other users in the environments. The permission formats on different content sources may be inconsistent. Further, users may obtain permissions for the objects directly by permission assignments to specific users and/or through inheritance via group permissions. The sources of permissions, such as from specific groups, may not be readily apparent. Standardizing permissions for all users for all file hierarchy levels, each object, and every access control list on content sources across disparate storage devices may be processor-intensive, time-consuming, and inefficient.

SUMMARY

As will be described in greater detail below, the present disclosure describes various systems and methods for producing access control list caches including effective information access permissions across disparate storage devices.

In one embodiment, a method for producing access control list caches including effective information access permissions across disparate storage devices may include (i) receiving, at a computing device, an instruction to prepare an access control list (ACL) cache and (ii) performing a security action. The security action may include (A) recursively parsing, at the computing device, at least one respective ACL for information stored on at least two disparate storage devices, (B) identifying, at each step of recursion, each direct user and each indirect user having information access permissions in at least one of the respective ACLs, (C) determining, for each unique user in the respective ACLs, per-control point effective permissions, and (D) storing the per-control point effective information access permissions in the ACL cache.

In an example, the method may include (i) fetching, for each file stored on the at least two disparate storage devices, the respective ACLs, (ii) looking-up, in the ACL cache, each respective ACL, and (iii) performing the security action when the information describing each ACL is absent from the ACL cache.

In some embodiments, the method may include periodically repeating the fetching, the looking-up, and the performing the security action. In an embodiment, the method may include receiving the instruction to prepare the ACL cache in response to the ACL cache being invalidated.

In an example, the method may include searching the ACL cache for a per-control point effective information access permission for a specific user.

In some embodiments, the control point may be a file. In some embodiments, the control point may be a folder.

In some examples, the security action may include generating a report of information in the ACL cache. In an example, the security action may include displaying information from the ACL cache on a display device.

In one example, a system for producing access control list caches including effective information access permissions across disparate storage devices may include several modules stored in memory, including (i) a receiving module, stored in a memory, that receives an instruction to prepare an access control list cache, (ii) a performing module, stored in the memory, that performs a security action, and (iii) at least one physical processor that executes the receiving module and the performing module. The security action may include (A) recursively parsing, at the system, at least one respective ACL for information stored on at least two disparate storage devices, (B) identifying, at each step of recursion, each direct user and each indirect user having information access permissions in at least one of the respective ACLs, (C) determining, for each unique user in the respective ACLs, per-control point effective permissions, and (D) storing the per-control point effective information access permissions in the ACL cache.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the computing device, an instruction to prepare an access control list cache and (ii) perform a security action. The security action may include (A) recursively parsing, at the computing device, at least one respective ACL for information stored on at least two disparate storage devices, (B) identifying, at each step of recursion, each direct user and each indirect user having information access permissions in at least one of the respective ACLs, (C) determining, for each unique user in the respective ACLs, per-control point effective permissions, and (D) storing the per-control point effective information access permissions in the ACL cache.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for producing access control list caches including effective information access permissions across disparate storage devices.

In some examples, provided systems and methods may compute effective user permissions from user permissions and/or group permissions. In some examples, users may be members of groups, where members of the group have permissions as a result of memberships in the groups.

In some examples, provided systems and methods may compute effective user permissions by recursively parsing at least one respective access control list (ACL) controlling access to information stored on at least two disparate storage devices. In some embodiments, membership information may be fetched from active directories. In some examples, each disparate storage device may have at least one respective ACL, where the ACLs have inconsistent permission formats. The provided systems and methods may identify, at each step of recursion, each direct user (e.g., having user-specific permission to access the information) and each indirect user (e.g., having permission to access the information as a result of membership in a group having permission to access the information) having information access permissions in at least one of the respective ACLs. The provided systems and methods may determine (e.g., for each unique user in the respective ACLs) per-control point effective permissions. The provided systems and methods may store the per-control point effective information access permissions in an ACL cache.

By doing so, the systems and methods described herein may improve the overall functionality of computing devices by automatically performing preemptive security actions to normalize object permissions to a common format, which may enable a higher level of protection for sensitive information. For example, the provided techniques may advantageously improve the functionality of computing devices by improving data protection services and/or software. Also, in some examples, the systems and methods described herein may advantageously improve the functionality of computing devices by automatically saving power, saving time, better managing information storage devices, and/or better managing network bandwidth utilization. Also, in some examples, the systems and methods described herein may reduce time necessary to compute effective entitlements of users to access specific information objects versus determining entitlement for users on-demand. In some examples, the systems and methods described herein may speed searches of files across multiple content sources (e.g., stored on at least two disparate storage devices.

Figure 1:
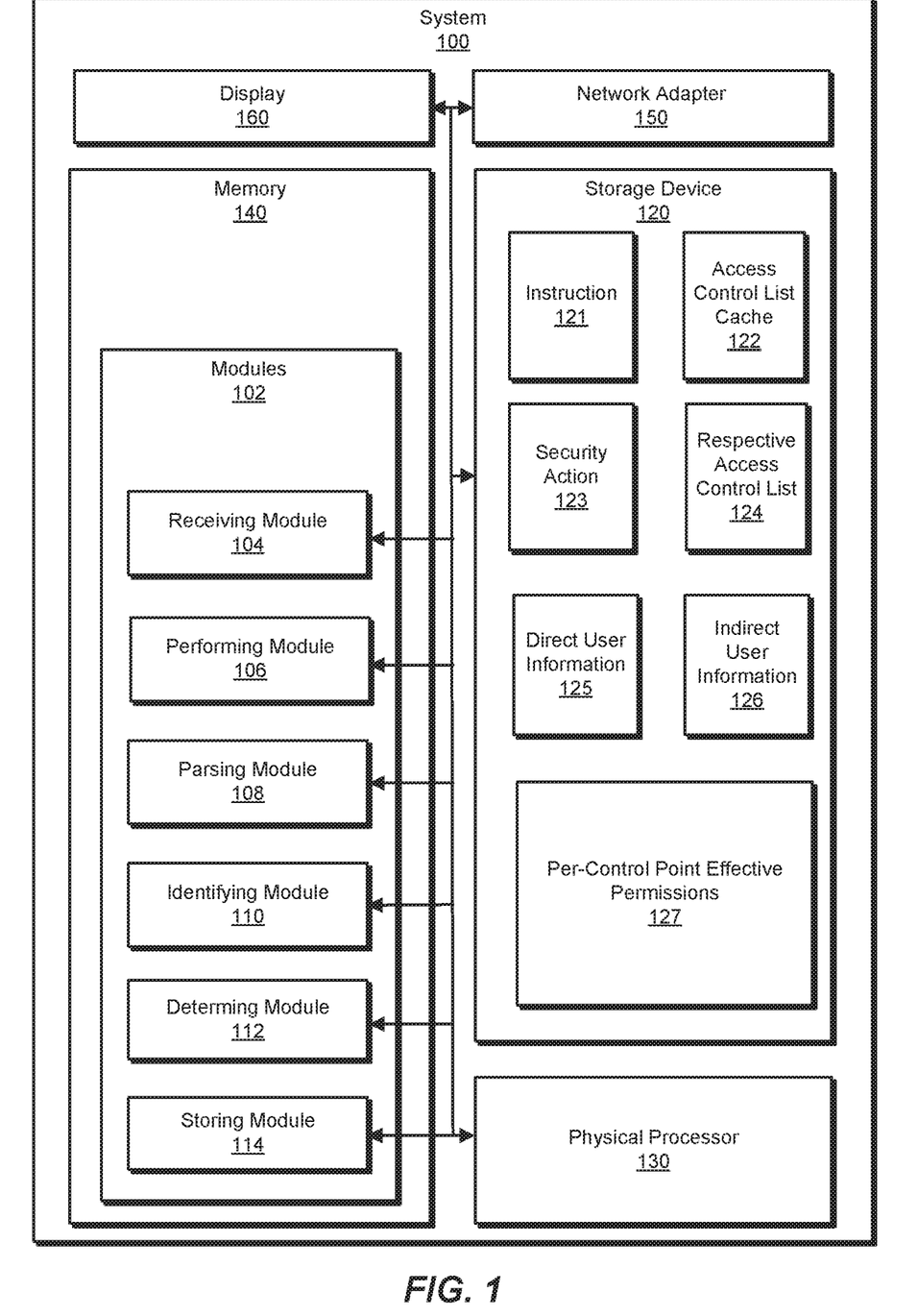
FIG. 1 is a block diagram of an example system for producing access control list caches including effective information access permissions across disparate storage devices.
Figure 2:
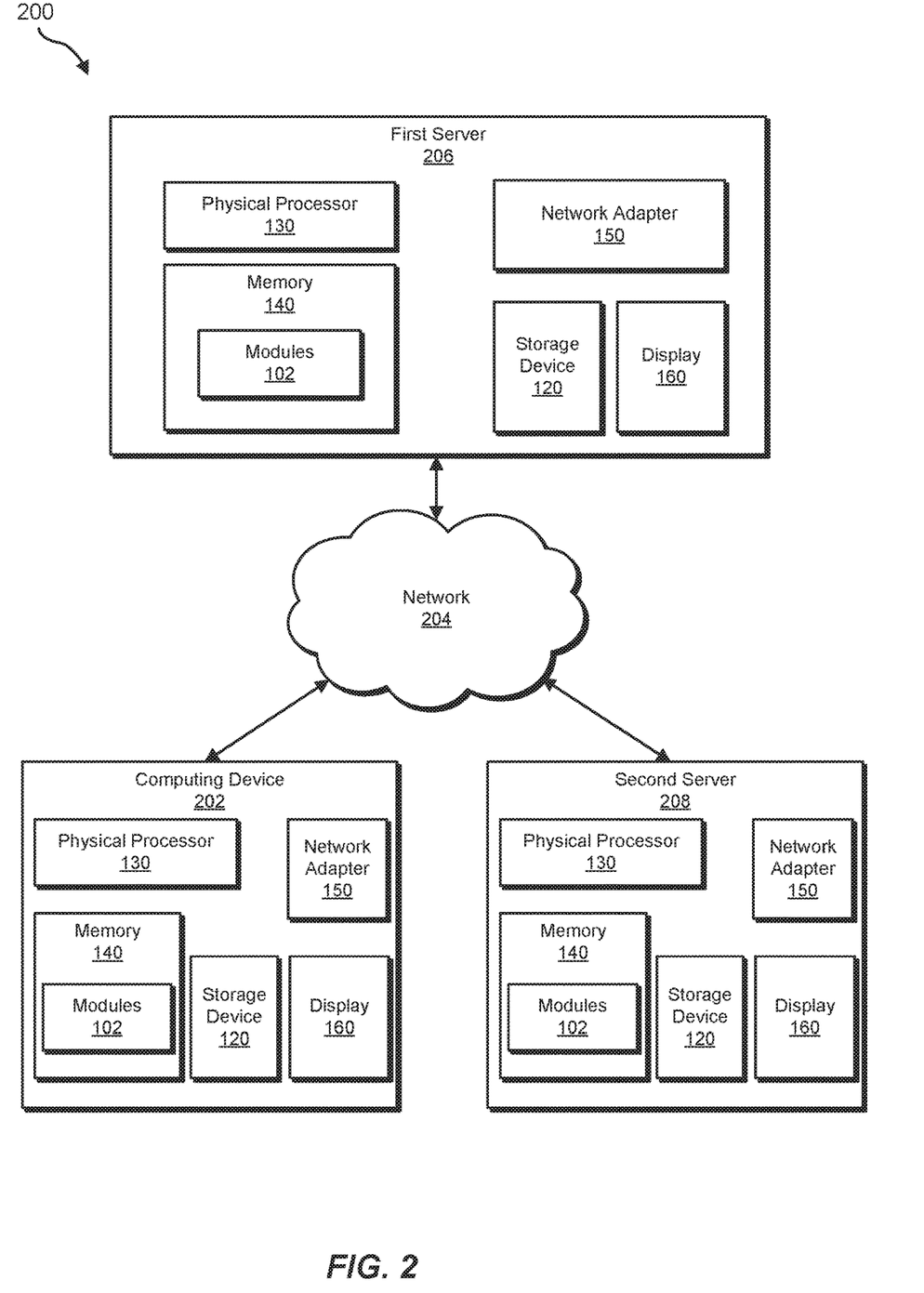
FIG. 2 is a block diagram of an additional example system for producing access control list caches including effective information access permissions across disparate storage devices.
Figure 3:
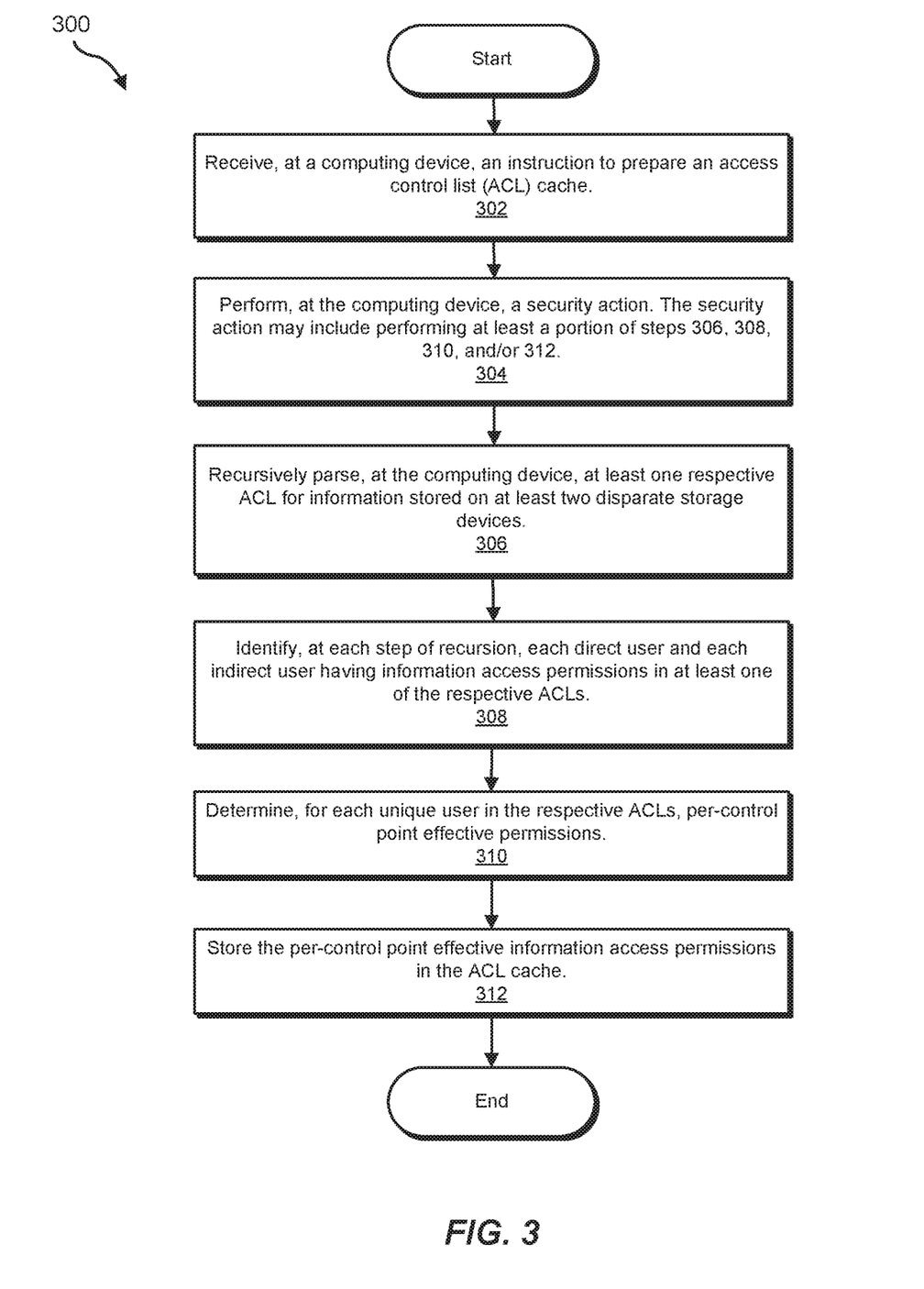
FIG. 3 is a flow diagram of an example method for producing access control list caches including effective information access permissions across disparate storage devices.
Figure 4:
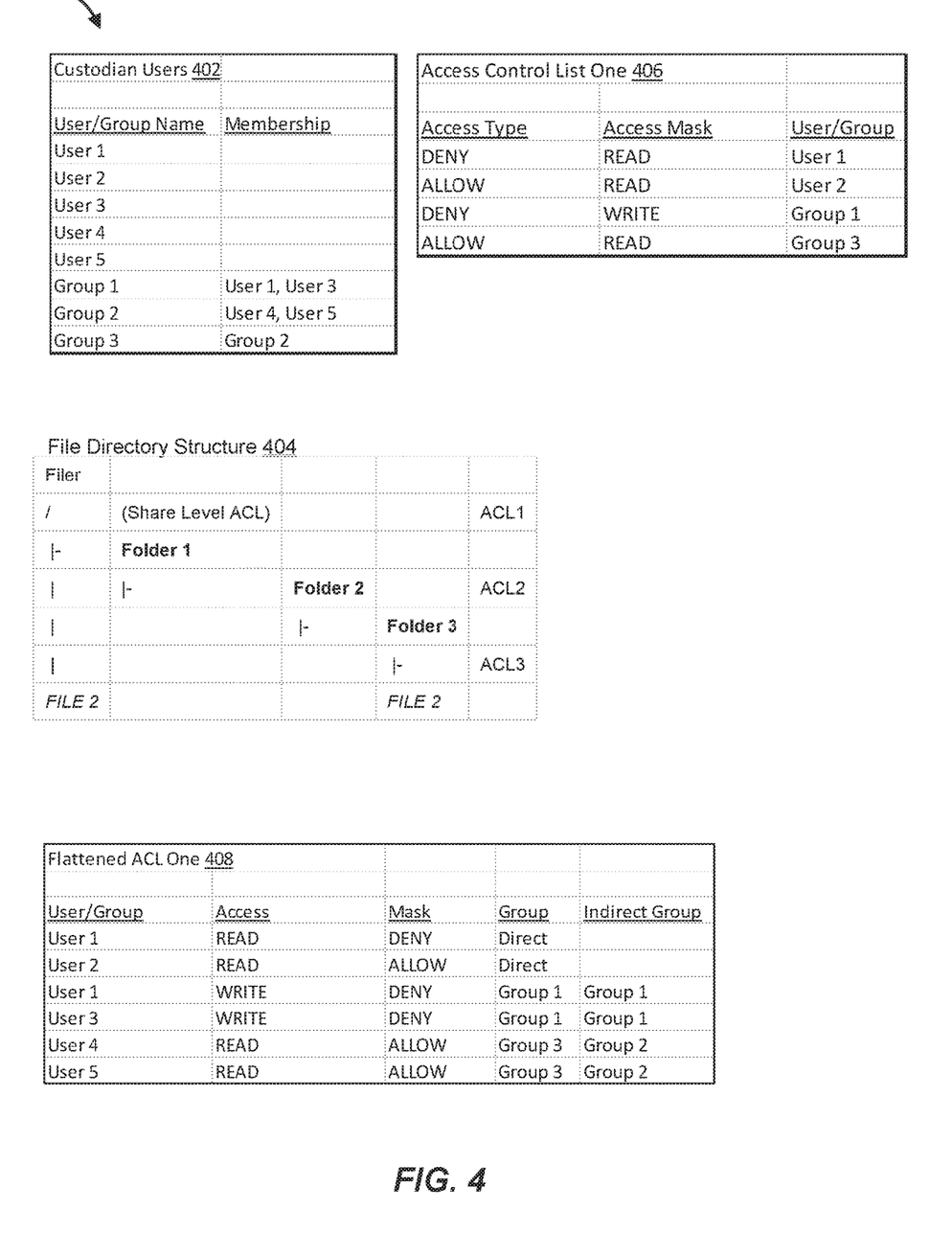
FIG. 4 depicts a block diagram of non-limiting example custodian user information, a respective file directory structure, an access control list, and a flattened access control list.

The following will provide, with reference to FIGS. 1-2 and 4, detailed descriptions of example systems for producing access control list caches including effective information access permissions across disparate storage devices. Detailed descriptions of corresponding computer-implemented methods will also be provided in connection with FIG. 3.

FIG. 1 is a block diagram of an example system 100 for producing access control list caches including effective information access permissions across disparate storage devices. As illustrated in this figure, example system 100 may include one or more modules 102 for performing one or more tasks. As will be explained in greater detail below, modules 102 may include a receiving module 104, a performing module 106, a parsing module 108, an identifying module 110, a determining module 112, and/or a storing module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., a computing device 202, a first server 206, and/or a second server 208). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of an instruction 121, an access control list (ACL) cache 122, a security action 123, at least one respective access control list (ACL) 124 (e.g., for information stored on at least two disparate storage devices), direct user information 125 (e.g., describing a direct user having explicit user-specific information access permissions to access respective information), indirect user information 126 (e.g., describing an indirect user having information access permissions as a result of membership in a group having permission to access respective information), and/or per-control point effective permissions 127. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate producing access control list caches including effective information access permissions across disparate storage devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more network adapters, such as network adapter 150. In some examples, network adapter 150 may be a physical network adapter connected to a physical network (e.g., a network 204 in FIG. 2). IN some examples, a network adapter may also be referred to as a network interface card (NIC).

As illustrated in FIG. 1, example system 100 may also include one or more display devices, such as display 160. Display 160 generally represents any type or form of device capable of visually displaying information (e.g., to a user). In some examples, display 160 may present a graphical user interface. In non-limiting examples, display 160 may present at least a portion of information indicating one or more of instruction 121, access control list cache 122, security action 123, respective ACL 124, direct user information 125, indirect user information 126, and/or per-control point effective permissions 127.

Example system 100 in FIG. 1 may be implemented in a variety of ways. For example, all or a portion of example system 100 may represent portions of example system 200 in FIG. 2. As shown in FIG. 2, system 200 may include computing device 202 in communication with first server 206 via network 204, as well as second server 208 in communication with first server 206 via network 204. In one example, all or a portion of the functionality of modules 102 may be performed by computing device 202, first server 206, second server 208, and/or any other suitable computing system. As is described in greater detail herein, one or more of modules 102 from FIG. 1 may, when executed by at least one processor of computing device 202, first server 206, and/or second server 208, enable computing device 202, first server 206, and/or second server 208 to produce access control list caches including effective information access permissions across disparate storage devices.

Computing device 202 generally represents any type or form of computing device capable of reading computer-executable instructions. In some examples, computing device 202 may represent a computer running security software, such as security software implementing access control techniques. In some examples, security software may include a processor-readable medium storing computer-readable instructions that when executed cause a processor in a computing device to perform a security action. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202, first server 206, and/or second server 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network. In some examples, network 204 may provide at least one information transfer path.

First server 206 generally represents any type or form of computing device capable of reading computer-executable instructions. In some examples, first server 206 may represent a computer running security software, such as security software implementing access control techniques. Additional examples of first server 206 include, without limitation, storage servers, database servers, application servers, and/or web servers configured to run certain software applications and/or provide various storage, database, and/or web services. Although illustrated as a single entity in FIG. 2, first server 206 may include and/or represent a plurality of servers that work and/or operate in conjunction with one another.

In some examples, first server 206 may be a tangible storage device storing information (e.g., content) secured using access control properties such as an access control list. In some examples, first server 206 may have uniquely assigned permissions determining a type and/or degree of access to the information stored thereby, whereby owners of the information can control operations on the information by other users of first server 206. In some examples, the permission formats on second server 208 may be inconsistent with those of second server 208. In some non-limiting embodiments, permission types may include read access, write access, delete access, and/or create access.

Second server 208 generally represents any type or form of computing device capable of reading computer-executable instructions. In some examples, second server 208 may represent a computer running security software, such as security software implementing access control techniques. Additional examples of second server 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

In some examples, second server 208 may be a tangible storage device storing information (e.g., content) secured using access control properties such as an access control list.

In some examples, second server 208 may have uniquely assigned permissions determining a type and/or degree of access to the information stored thereby, whereby owners of the information can control operations on the information by other users of second server 208. In some examples, the permission formats on second server 208 may be inconsistent with those of first server 206.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

FIG. 3 is a flow diagram of an example computer-implemented method 300 for producing access control list caches including effective information access permissions across disparate storage devices. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive (e.g., at a computing device) instructions to prepare access control list (ACL) caches. The systems described herein may perform step 302 in a variety of ways. For example, receiving module 104 may, as part of computing device 202 in FIG. 2, receive, at computing device 202, instruction 121 to prepare access control list (ACL) cache 122.

In some examples, the method 300 may include (i) fetching, for each file stored on the at least two disparate storage devices, the respective ACLs, (ii) looking-up, in the ACL cache, each respective ACL, and (iii) performing the security action when the information describing each ACL is absent from the ACL cache. In some embodiments, the method 300 may include periodically repeating the fetching, the looking-up, and the performing the security action.

In an embodiment, the ACL cache being invalidated may trigger issuing an instruction to update, repair, and/or prepare the ACL cache by performing at least a portion of method 300. In some examples, the method 300 may include receiving the instruction to prepare the ACL cache in response to the ACL cache being invalidated. In an embodiment, the ACL cache may be invalidated when a new content source is detected.

The term "access control list cache," as used herein, generally refers to cache storage (e.g., in a cache memory and/or other high-speed memory) of an access control list for future use. In some examples, storing an ACL cache may enable future high-speed retrieval of information stored in the cache ACL to save time, processor cycles, and/or network bandwidth.

As illustrated in FIG. 3, at step 304 one or more of the systems described herein may perform security actions. In some examples, the security actions may include performing at least a portion of at least one of steps 306 308, 310, and/or 312. The systems described herein may perform step 304 in a variety of ways. For example, performing module 106 may, as part of computing device 202 in FIG. 2, perform security action 123.

In some examples, security action 123 may include blocking access to devices (e.g., storage devices, memories, network devices, servers, network interface devices, information transfer paths, etc.), allowing limited access to devices, allowing read-only access to devices, encrypting information, and/or other acts limiting access to devices. In some examples security action 123 may be performed automatically. In some embodiments, security action 123 may attempt to identify and/or ameliorate potential security risks. In some examples, security action 123 may include blocking access to and/or by executing processes. In additional examples, security action 123 may include displaying, on user displays, warnings indicating that processes may be potentially dangerous.

In some examples, security actions may include displaying, on user displays (e.g., devices of computing device 202, first server 206, and/or second server 208 in FIG. 2), messages indicating imposing of security actions. In additional examples, the security actions may include displaying, on user displays, warnings indicating that access permissions in the ACL caches indicate that at least one user is not permitted to access at least some digital information stored on at least one tangible storage device (e.g., first server 206, and/or second server 208 in FIG. 2). In additional examples, the security actions may include displaying, on user displays, warnings indicating that access permissions in the ACL caches indicate that at least one user is permitted to access at least some digital information stored on at least one tangible storage device (e.g., first server 206, and/or second server 208 in FIG. 2).

In an embodiment, security actions may include sending, to computing device 202, first server 206, and/or second server 208 in FIG. 2, messages indicating imposing of security actions.

In some examples, security actions may include prophylactic measures taken to safeguard electronic information. Prophylactic measures may include acts undertaken to prevent, detect, and/or mitigate vulnerabilities of electronic information, to implement data loss prevention policies (e.g., preventing and/or mitigating privacy leakage), and/or to thwart malicious activities targeting electronic information on electronic computing devices.

As illustrated in FIG. 3, at step 306 one or more of the systems described herein may recursively parse (e.g., at the computing device) at least one respective ACL for information stored on at least two disparate storage devices. The systems described herein may perform step 306 in a variety of ways. For example, parsing module 108 may, as part of computing device 202 in FIG. 2, recursively parse (e.g., at computing device 202), at least one respective ACL 124 for information stored on at least two disparate storage devices (e.g., first server 206 and/or second server 208).

As illustrated in FIG. 3, at step 308 one or more of the systems described herein may identify (e.g., at each step of recursion) direct users (e.g., each direct user) and indirect users (e.g., each indirect user) having information access permissions in at least one of the respective ACLs. The systems described herein may perform step 308 in a variety of ways. For example, identifying module 110 may, as part of computing device 202 in FIG. 2, identify, at each step of recursion, each direct user (e.g., by using direct user information 125) and each indirect user (e.g., by using indirect user information 126) having information access permissions in at least one of the respective ACLs 124.

As illustrated in FIG. 3, at step 310 one or more of the systems described herein may determine (e.g., for each unique user in the respective ACLs) per-control point effective permissions. The systems described herein may perform step 310 in a variety of ways. For example, determining module 112 may, as part of computing device 202 in FIG. 2, determine, for each unique user in the respective ACLs, per-control point effective permissions 127.

In some examples, the control point may be a file. In some embodiments, the control point may be a folder. In some embodiments, limiting computations to determining per-control point effective permissions instead of determining permissions for all files may save time and processor cycles.

In an example, computing per-control point effective permissions may include: (i) fetching, for each file, metadata including respective ACL information, (ii) looking-up the ACL information in the ACL cache, (iii) when the ACL information is not present in the ACL cache, computing a flattened ACL, (iv) populating the ACL cache with the flattened ACL, (v) computing effective permissions, and (vi) repeating steps (i) through (v) until ACL information for each file is included in the ACL cache. In some examples, the ACL cache may contain a reduced version of ACL which is computing using active directory user and/or group memberships and expanding ACLs and/or access control entities (ACEs) from various content sources.

In some embodiments, the following steps may be used to compute effective permissions: (i) parse the ACL recursively, (ii) at each step of recursion, find direct and indirect users from group(s), (iii) for each user, compute permissions at a level and for each unique user in the ACL, compute effective permissions and identify groups from which the permission is inherited, (iv) compute a flattened ACL.

In some embodiments, per-control point effective permissions may be assigned expiration times and/or dates. In some embodiments, per-control point effective permissions may be used to trigger remediation actions on access lists.

We turn now to FIG. 4.

FIG. 4 depicts a block diagram 400 of non-limiting example custodian user information 402, a respective file directory structure 404, an access control list 406, and a flattened access control list 408.

In an embodiment, example custodian user information 402 may include a list of users, groups of users, and membership listings identifying which users are in a respective group.

In some examples, respective file directory structure 404 includes a hierarchy of file folders (e.g., three), files (e.g., two), and respective ACLs (e.g., ACL1, ACL2, and ACL3)

In an example, access control list 406 is ACL1 and may include access types, access masks, and security identifiers (e.g., SID, such as user/group identifier information).

In an example, flattened access control list 408 may be a per-user, per-access cross-reference of permissions. In an example, flattened access control list 408 may not be a simplified list.

We now return to FIG. 3.

The term "control point," as used herein, generally refers to a level in an information storage hierarchy at which a respective access control is present. Examples of control points include, without limitation, a root directory in an information storage hierarchy for which there is a respective access control, a specific file folder in an information storage hierarchy for which there is a respective access control, a specific file in an information storage hierarchy for which there is a respective access control, etc. In some examples, an access control for a specific level in an information storage hierarchy may apply to all folders and/or files at levels in the hierarchy that are equal to the specific level and/or lower than the specific level.

As illustrated in FIG. 3, at step 312 one or more of the systems described herein may store the per-control point effective information access permissions in ACL caches. The systems described herein may perform step 312 in a variety of ways. For example, storing module 114 may, as part of computing device 202 in FIG. 2, store per-control point effective information access permissions 127 in ACL cache 122.

In some embodiments, the method 300 may include searching the ACL cache for a per-control point effective information access permission for a specific user. In some embodiments, a request from a user to access specific digital information (e.g., at a control point) and perform a type of action (e.g., create, delete, modify, read, write, etc.) may be received, thus triggering the searching the ACL cache for a per-control point effective information access permission for the requesting user. In some examples, the searching the ACL cache may yield an approval for the user to access the digital information and perform the requested type action on the digital information. In some embodiments, the searching the ACL cache may yield a denial for the user to access the digital information and perform the requested type action on the digital information. In an embodiment, when the search results in a miss, step 304 is triggered. In some examples, the security action may include displaying results from the searching the ACL cache on a display device.

In an example, the security action may include generating a report of information in the ACL cache (e.g., an entitlement report). In some examples, the security action may include displaying information from the ACL cache on a display device.

As detailed above, the steps outlined in computer-implemented method 300 in FIG. 3 may provide methods for automatically producing ACL caches including effective information access permissions across disparate storage devices and, in some examples, automatically performing an action in response to the same. In some examples, the provided systems and methods may improve the overall functionality of computing devices by automatically performing preemptive security actions to identify, prevent, and/or mitigate data leakage, thus enabling a higher level of protection for sensitive information.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In some examples, the singular portends the plural. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for producing access control list caches including effective information access permissions across disparate storage devices, at least a portion of the method being performed by a computing device comprising at least one processor, the method comprising:
   receiving, at the computing device, an instruction to prepare an access control list (ACL) cache; and
   performing a security action, the security action comprising:
      recursively parsing, at the computing device, at least one respective ACL for information stored on at least two disparate storage devices;
      identifying, at each step of recursion, each direct user and each indirect user having information access permissions in at least one of the respective ACLs;
      determining, for each unique user in the respective ACLs, per-control point effective information access permissions across the at least two disparate storage devices, wherein each control point is a level in an information storage hierarchy at which respective access control is present; and
      storing the per-control point effective information access permissions in the ACL cache.

2. The computer-implemented method of claim 1, further comprising:

fetching, for each file stored on the at least two disparate storage devices, the respective ACLs;
looking-up, in the ACL cache, each respective ACL; and
performing the security action when the information describing each ACL is absent from the ACL cache.

3. The computer-implemented method of claim 2, further comprising periodically repeating the fetching, the looking-up, and the performing the security action.

4. The computer-implemented method of claim 1, further comprising receiving the instruction to prepare the ACL cache in response to the ACL cache being invalidated.

5. The computer-implemented method of claim 1, further comprising searching the ACL cache for a per-control point effective information access permission for a specific user.

6. The computer-implemented method of claim 1, wherein the control point is a file.

7. The computer-implemented method of claim 1, wherein the control point is a folder.

8. The computer-implemented method of claim 1, wherein the security action further comprises generating a report of information in the ACL cache.

9. The computer-implemented method of claim 1, wherein the security action further comprises displaying information from the ACL cache on a display device.

10. The computer-implemented method of claim 1, further comprising storing the per-control point effective information access permissions in the ACL cache in a per-user, per-access format comprising a user identifier, respective information access type, and respective access permission mask information.

11. A system for producing access control list caches including effective information access permissions across disparate storage devices, the system comprising:
a first receiving module, stored in a memory, that receives an instruction to prepare an access control list (ACL) cache; and
a first performing module, stored in the memory, that performs a security action, the security action comprising:
recursively parsing, at the system, at least one respective ACL for information stored on at least two disparate storage devices;
identifying, at each step of recursion, each direct user and each indirect user having information access permissions in at least one of the respective ACLs;
determining, for each unique user in the respective ACLs, per-control point effective information access permissions across the at least two disparate storage devices, wherein each control point is a level in an information storage hierarchy at which respective access control is present;
storing the per-control point effective information access permissions in the ACL cache; and
at least one physical processor that executes the receiving module and the performing module.

12. The system of claim 11, further comprising:
a fetching module, stored in the memory, that fetches, for each file stored on the at least two disparate storage devices, the respective ACLs;
a looking-up module, stored in the memory, that looks-up, in the ACL cache, each respective ACL; and
a second performing module, stored in the memory, that performs the security action when the information describing each ACL is absent from the ACL cache.

13. The system of claim 12, wherein the fetching module, the looking-up module, and the second performing module periodically repeat the fetching, the looking-up, and the performing the security action.

14. The system of claim 11, further comprising a second receiving module, stored in the memory, that receives the instruction to prepare the ACL cache in response to the ACL cache being invalidated.

15. The system of claim 11, further comprising a searching module, stored in the memory, that searches the ACL cache for a per-control point effective information access permission for a specific user.

16. The system of claim 11, wherein the security action further comprises displaying information from the ACL cache on a display device.

17. A non-transitory computer-readable medium comprising one or more computer-executable instructions that, when executed by at least one processor of a computing device, cause the computing device to:
receive, at the computing device, an instruction to prepare an access control list (ACL) cache; and
perform a security action, the security action comprising:
recursively parsing, at the computing device, at least one respective ACL for information stored on at least two disparate storage devices;
identifying, at each step of recursion, each direct user and each indirect user having information access permissions in at least one of the respective ACLs;
determining, for each unique user in the respective ACLs, per-control point effective information access permissions across the at least two disparate storage devices, wherein each control point is a level in an information storage hierarchy at which respective access control is present; and
storing the per-control point effective information access permissions in the ACL cache.

18. The non-transitory computer-readable medium of claim 17, wherein the security action further comprises:
fetching, for each file stored on the at least two disparate storage devices, the respective ACLs;
looking-up, in the ACL cache, each respective ACL; and
performing the security action when the information describing each ACL is absent from the ACL cache.

19. The non-transitory computer-readable medium of claim 17, further comprising one or more computer-executable instructions that, when executed by the at least one processor of the computing device, cause the computing device to receive the instruction to prepare the ACL cache in response to the ACL cache being invalidated.

20. The non-transitory computer-readable medium of claim 17, wherein the security action further comprises searching the ACL cache for a per-control point effective information access permission for a specific user.

21. The non-transitory computer-readable medium of claim 17, wherein the security action further comprises displaying information from the ACL cache on a display device.

* * * * *